Feb. 16, 1926.
R. R. STABLER
1,573,459
AUTOMOBILE LOCK
Original Filed Dec. 23, 1919      2 Sheets-Sheet 1
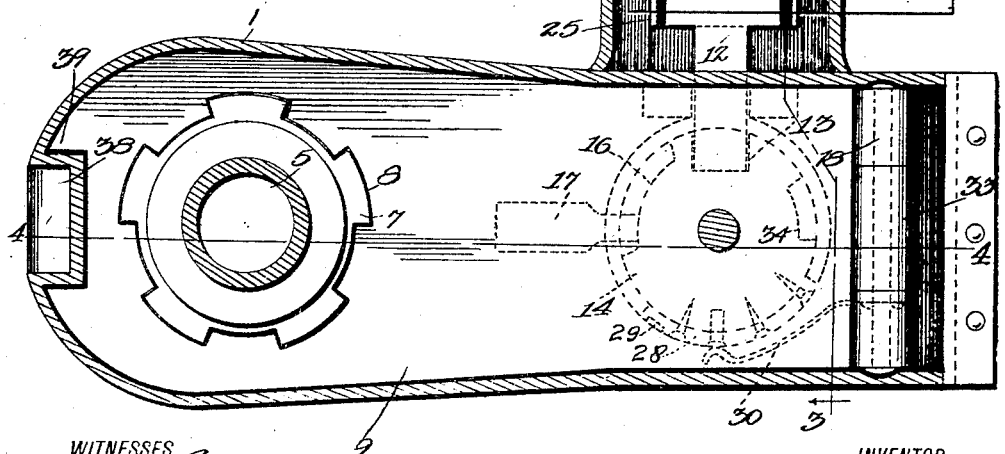
INVENTOR
Robinson R. Stabler
BY
ATTORNEYS

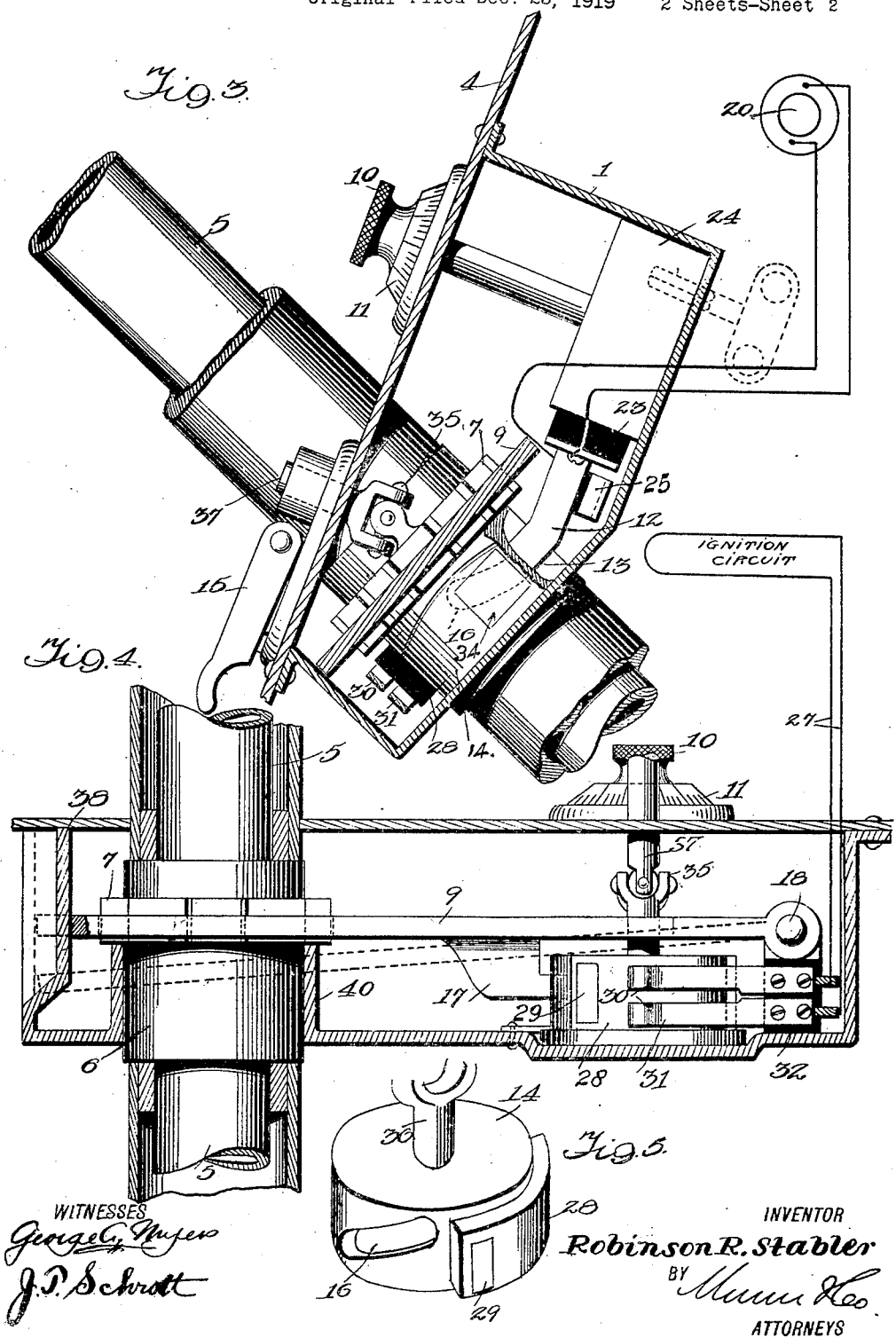

Patented Feb. 16, 1926.

1,573,459

UNITED STATES PATENT OFFICE.

ROBINSON RYLAND STABLER, OF BALTIMORE, MARYLAND.

AUTOMOBILE LOCK.

Application filed December 23, 1919, Serial No. 346,873. Renewed June 15, 1925.

*To all whom it may concern:*

Be it known that I, ROBINSON RYLAND STABLER, a citizen of the United States, and a resident of Baltimore, Maryland, have invented certain new and useful Improvements in Automobile Locks, of which the following is a specification.

My invention relates to improvements in automobile locks, it being more particularly an improvement on the automobile lock disclosed in my co-pending application filed October 13, 1919, Serial No. 330,256, and it consists in the construction, combinations and arrangements of parts herein described and claimed.

The foremost object of my invention is to provide an automobile lock constructed and arranged in such a manner that the operator will know that the locking of the car has not been completed if the engine is still running.

Another object of the invention, more specifically stated, is to provide an automobile lock in which it is necessary to not only first rock the locking plate to lock the steering shaft by turning the actuating plug which controls the ignition circuit, but also to operate the combination safe lock and project its bolt into locking engagement with the actuating plug, said safe lock controlling the generator circuit; it being necessary to perform both operations mentioned before the engine can be brought to a stop, thereby indicating to the operator that both the steering shaft and all electric operating circuits are locked.

A further object of the invention is to provide an automobile lock which includes an actuating plug for rocking a lock plate into and out of locking engagement with the steering shaft, the actuating plug controlling the ignition circuit in such a manner that it becomes impossible to start the engine when the steering shaft is locked.

A further object of the invention is to provide an additional or safety recess in the actuating plug not quite so deep as the main bolt recess, so that the combination lock bolt can be projected into that safety recess when the lock plate is moved to the open position, this however, without opening the generator circuit which the combination lock controls, so as to prevent the accidental movement of the actuating plug and locking of the steering shaft when the car is moving at a high speed.

A further object of the invention is to provide an automobile lock with means for controlling the generator and ignition circuits, thereby dispensing with the use of the ignition switch ordinarily furnished with each automobile.

Other objects and advantages will appear in the following specification, reference being had to the accompanying drawings, in which:—

Figure 1 is a plan view of the improved automobile lock as it appears beneath the cowl or instrument board of an automobile, diagrammatically illustrating the association of the ignition and generator circuits, Figure 2 is an enlarged plan view of the improved lock, Figure 3 is a cross section taken substantially on the line 3—3 of Figure 2, Figure 4 is a longitudinal section taken substantially on the line 4—4 of Figure 2, and Figure 5 is a detail perspective view of the actuating plug.

So far as general construction is concerned, the present automobile lock is very much like the lock disclosed in my co-pending application filed October 13, 1919, Serial No. 330,256, but differs greatly in one respect, namely, that by the present arrangement of the contacts, both the generator and ignition circuits are controlled. The novel manner of combining these circuit controls, and the mechanism of the automobile lock, enables the operator to positively know when his automobile is locked, because when such is the case, it is impossible for the engine to run, this being the principal indication that the automobile is locked.

A casing 1 encloses all of the important mechanism of the automobile lock, including the various circuit controlling contacts, this casing being riveted or otherwise secured at 2, through the medium of flanges 3, to the under side of the cowl or instrument board 4 of the automobile. This entirely closed casing prevents tampering with the lock mechanism.

The steering shaft 5 extends through the casing and carries a sleeve 6, which is preferably brazed thereto, with teeth 7 which are engaged by the teeth of the opening 8 in the lock plate 9, when the latter is in the uppermost or full line position in Figure 4. When the plate is in the lowermost or dotted line position, then the steering shaft 5 is free to be turned in any direction.

It is necessary to properly manipulate the knob 10 of the combination safe lock 11, to retract the bolt 12 from the main bolt recess 13 of the actuating plug 14, before the latch handle 15 of that plug can be turned in order to move the lock plate 9 down to the dotted line position in Figure 4 through the medium of the cam slot 16 in the actuating plug and the actuating stud 17 on the lock plate. It is easy to see that the turning of the actuating plug causes the rocking of the lock plate 9 on its fulcrum 18 by virtue of the cam slot 16. It naturally follows that when the bolt 12 is projected, as indicated in Figures 2 and 3, the actuating plug 14 cannot be turned and consequently, the lock plate 9 cannot be moved to release the teeth 7 and the steering shaft 5.

The combination safe lock 11 controls the generator circuit, which is diagrammatically designated by the wire 19 and generator 20. To this end, the wires 19 run to fixed contacts 21, 22 on insulating mountings 23 on the casing 24 of the combination lock, a movable bridge contact 25, mounted on an insulating block 26 on the bolt 12, completing the generator circuit when the bolt 12 is retracted by the manipulation of the knob 10, as set out above.

The engine ignition circuit, diagrammatically designated by the wires 27, is controlled by the actuating plug 14. This plug carries an insulating segment 28 with a bridge piece 29 to complete a circuit across the spring contacts 30, 31 which are mounted on an insulating block 32 in any suitable location as, for example, on the lug 33 on which the lock plate 9 is pivoted. The wires 27 run to the spring contacts 30, 31.

A safety recess 34 in the actuating plug 14, enables the partial projection of the bolt 12 so as to lock the actuating plug against rotation while the automobile is in operation, and thereby obviate the possibility of the lock plate 9 being accidentally rocked into locking engagement with the teeth 7 of the steering shaft, while the automobile may perhaps be going at a high speed. It is necessary to turn the knob 10 only a very short distance in order to throw the bolt into the safety recess, which it is to be observed is very shallow and not so deep as the main recess 13, such turning of the knob neither destroying the combination arrived at or moving the bolt far enough to disengage the bridge contact 25 from the fixed generator contacts 21, 22.

A universal joint 35 compensates for the different axial positions of the actuating plug shaft 36 and the stub shaft 37 of the latch 15. This latch may be of any desired design, its purpose being to hold the actuating plug 14 in its rotated position, under ordinary circumstances. As shown in Fig. 3, the casing 1 has been adapted to the combination lock casing 24, the spindle of which extends in a direction different from that of the steering shaft. Since this diversity of direction is likely to occur in respect to all steering shafts and lock spindles, it is important that the casing be adaptable as described. The provision of the safety recess 34, described in the preceding paragraph, is an additional and more secure safeguard against the accidental turning of the actuating plug, which it is recognized might happen even with the provision of the latch lever 15.

A guide 38, consisting of a stamped depression in one extremity of the casing 1, receives the bifurcated end 39 of the rockable lock plate 9 so as to guide the plate in its movements. It is also to be observed, from considering the guide 38 in Figure 4, that the casing is carried inwardly in the shape of a collar 40, which substantially houses the sleeve 6 and may be considered in the nature of a supporting bearing for the toothed periphery 7, should there be any tendency at all of the steering shaft 5 bearing downwardly by virtue of looseness and its weight.

The operation should be carefully considered in order that the advantages of the invention may be clearly understood. Assume first that the steering shaft 5 is locked. The lock plate 9 is then in the full line position in Figure 4, the bolt 12 of the combination safe lock occupies the main recess 13 in the actuating plug 14, and both the generator and ignition circuits 19, 27 are broken by virtue of the separation of the respective contacts 21, 22, 25 and 29, 30, 31.

Desiring to unlock the steering shaft 5 and to start the automobile engine, the operator properly manipulates the knob 10 of the combination safe lock until he succeeds in withdrawing the bolt 12 from the main recess 13. He withdraws the bolt to the limit, thereby engaging all generator contacts 21, 22, 25. But the engagement of these contacts is not sufficient to start the engine, nor has he yet unlocked the steering shaft 5.

Now the operator must turn the lever 15, and consequently the actuating plug 14, toward the right. This makes the cam slot 16 ride down on the actuating stud 17 and in turn move the lock plate 9 downwardly into the dotted line position in Figure 4, out of engagement with the teeth 7. The steering shaft 5 is now free, and the ignition circuit is closed by reason of the engagement of the bridge piece 29 with the spring contacts 30, 31.

The engine may now be cranked up and started, because the ignition circuit, which usually runs on battery current, is closed. The knob 10 is slightly turned to project the bolt 12 into the shallow safety recess 34, which is now in position to receive the bolt. This prevents accidental turning of the actuating plug and relocking of the steering shaft, as explained several times above.

On desiring to lock the automobile, or rather the steering shaft 5, the operator must turn the lever 15 toward the left, thereby lifting the lock plate 9. This act opens the ignition circuit, but the engine is still running on current from the generator 20. It is not sufficient that the lever 15 be turned as stated, and the shaft 5 locked by the consequent action of the plate 9. The engine is still running, and this is an indication to the operator that something else must be done in order to completely lock the automobile.

This final act consists in destroying the combination of the safe lock 11 by means of the knob 10. By turning the knob 10, the bolt 12 is extended in the now waiting main recess 13, and when thus extended, the combination is destroyed as stated, and at the same time, the generator circuit 19 is opened so that no current is available for further running of the engine.

It follows from the above that it is impossible to start the engine while the steering shaft 5 is locked by the plate 9, or in other words, out of control of the operator, because it is absolutely necessary to first turn the actuating plug 14 and thereby move the lock plate 9 downwardly, before the ignition circuit is closed through the bridging of the spring contacts 30, 31.

Similarly, it is impossible to stop the engine by the usual expedient of breaking or opening the engine circuit, without first locking the steering shaft by turning the lever 15 and actuating plug 14, and then finally destroying the combination in order to open the generator circuit. Both acts must be done before the engine stops.

In conclusion, it is to be observed that the improved automobile lock dispenses with the ordinary ignition switch usually furnished with every automobile. Both the ignition and generator circuits are controlled by the mechanism of the lock, and the arrangement is such that neither circuit can easily be tampered with.

While the construction and arrangement of the improved automobile lock as herein described and claimed, is that of a generally preferred form, obviously modifications and changes can be made without departing from the spirit of the invention or the scope of the claims.

I claim:

1. A lock comprising in combination, steering shaft locking means, actuating means therefor including ignition circuit making means functioning when the locking means reaches an inoperative position, and locking means for said actuating means, including associated generator circuit controlling means, the actuating means being prevented from operation while the shaft locking means is in the inoperative position.

2. A lock comprising steering part locking means, means for actuating said locking means, an ignition circuit controlled thereby, means for locking the actuating means and a generator circuit controlled thereby.

3. A lock comprising steering part locking means, actuating means therefor having an ignition switch, closed when the locking means is in the unlocked position; and a combination safe or other lock for the actuating means having a generator circuit switch, closed when its bolt is retracted and prevented from projection by the interposition of said actuating means.

4. In combination with steering mechanism, a combination-lock with a projectible bolt and a generator circuit switch closed when the bolt is retracted; locking means movable into and out of locking engagement with a steering mechanism part, and a manually actuated member with a connection for thus moving the locking means, provided with an ignition switch closed when the locking means is out of engagement with said part, then obstructing the projection of said bolt, but provided with a recess to receive the bolt and prevent accidental turning of the actuating means, the recess being shallow to avoid opening of the generator circuit.

5. The subcombination in a lock, of a lock plate actuating plug with an elongated bolt recess, and an operatively associated combination-lock casing likely to assume any of variable positions when mounted, with a bolt having an end shaped to enter the recess regardless of variations in the position of the casing.

6. The subcombination in an automobile lock, of a combination-lock bolt, a locking plate and actuating means therefor, with a main recess receiving the bolt for permanently locking said means, and a shallow recess for receiving said bolt to prevent accidental movement when the locking plate is in the unlocked position.

7. In a lock a steering mechanism part locking member, means in operative connection by which it is actuated to lock and unlock, an ignition switch embodied in the actuating means, open when said member is locked but closed when unlocked; and a combination-lock with a bolt projectible to lock said actuating means, having an associated generator circuit switch open when the bolt is projected but closed when retracted, the operation of both the actuating means and combination-lock being a prerequisite to the absolute locking of an automobile.

8. A lock comprising a suitably encased and mounted lock plate operatively associated with a part of the steering mechanism, revoluble means including an actuating plug with a bolt recess and cam slot, means carried by the plate engaging the slot, means for revolving the plug, a combination-lock with a bolt to enter the recess and lock the plug when the lock plate engages a steering mechanism part, and ignition and generator circuit switches respectively embodied in the actuating plug and combination-lock mechanisms, both open when the lock plate is in the position aforesaid.

9. The subcombination in an automobile lock, of generator and ignition circuits insulated from each other and from the lock, of a combination-lock bolt with an insulated bridge contact, lateral insulated generator circuit contacts at which the generator circuit terminates, an actuating plug with a recess adapted to be occupied by the bolt when projected, an insulated bridge piece carried by the plug, and associated contacts at which the ignition circuit terminates, engageable by the bridge piece when the combination-lock is manipulated to withdraw the bolt and permit movement of said plug.

10. The subcombination in an automobile lock, of a lock plate, a combination-lock bolt with an insulated bridge contact, insulated generator circuit contacts engageable by the bridge contact when the bolt is retracted, an actuating plug partially revoluble to unlock said lock plate, said plug having a recess then in position to receive the bolt and prevent accidental turning of the plug, said recess being shallow to avoid disengagement of said contact and the destruction of the combination by the partial operation of the lock to thus project the bolt.

ROBINSON RYLAND STABLER.